Sept. 9, 1941.   E. NIELSEN ET AL   2,255,081
GLASS WASHER
Filed Jan. 24, 1939   2 Sheets-Sheet 2

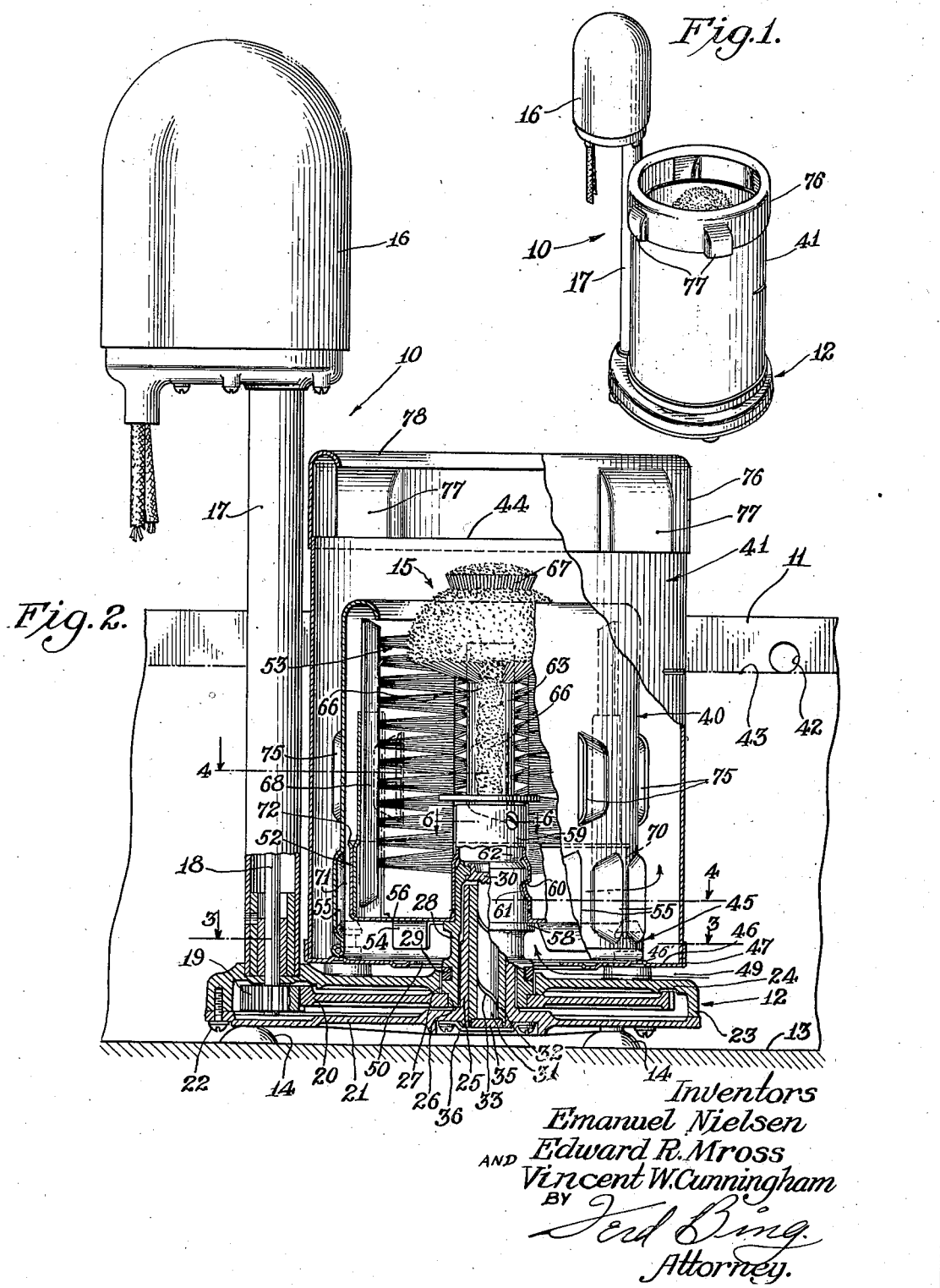

Inventors
Emanuel Nielsen
Edward R. Mross
AND Vincent W. Cunningham
BY
Fred Bing
Attorney.

Patented Sept. 9, 1941

2,255,081

UNITED STATES PATENT OFFICE 2,255,081

GLASS WASHER

Emanuel Nielsen and Edward R. Mross, Racine, Wis., and Vincent W. Cunningham, Chicago, Ill.; said Nielsen and said Mross assignors to said Cunningham Application January 24, 1939, Serial No. 252,638

7 Claims. (Cl. 15—76)

The invention relates generally to glass washers, and more particularly it relates to glass washers wherein scrubbing means rotatable about a substantially vertical axis is utilized to scrub the inner and outer surfaces of an inverted glass while immersed in a flowing body of cleansing liquid.

Due to the varying height of glasses which are to be scrubbed by such a machine it is necessary that the washing solution about the brushes be relatively deep in order to submerge brushing means to wash the wide variety of glasses.

When the washer is of a type adapted for mounting in present washing tanks, it has been found that a large proportion of the commercial washing tanks are too shallow to provide for submergence of the desired length of brushing structure.

In the application of Emanuel Nielsen, Serial Number 252,637, filed January 24, 1939, there is shown and claimed a glass washer which may be used in such shallow sinks, and which induces and maintains an elevated body of water or washing solution about the brushing means so that the brushing means is submerged and is subjected to a vigorous flushing flow of the elevated water.

The primary object of the present invention is to provide a new and improved glass washer operable in accordance with the broad principle of the washer disclosed and claimed by Nielsen in the aforementioned application, and having an improved and simplified construction and relation of the various elements thereof whereby manufacture and maintenance of the machine are facilitated.

A further object is to provide such a glass washer wherein the elements, by arrangement and form, cooperate in a novel manner to provide pumping means for inducing and maintaining the desired elevated body of water about the brushing structure.

Another object is to provide a glass washer wherein the overflow of the excess elevated water is controlled so as to insure uniform appearance and avoid splashing.

Other objects and advantages will become apparent from the following description, taken in connection with the accompanying drawings, in which:

Fig. 1 is a perspective view of a glass washer embodying the features of the invention.

Fig. 2 is an enlarged vertical sectional view of the washer shown in Fig. 1.

Figure 3:
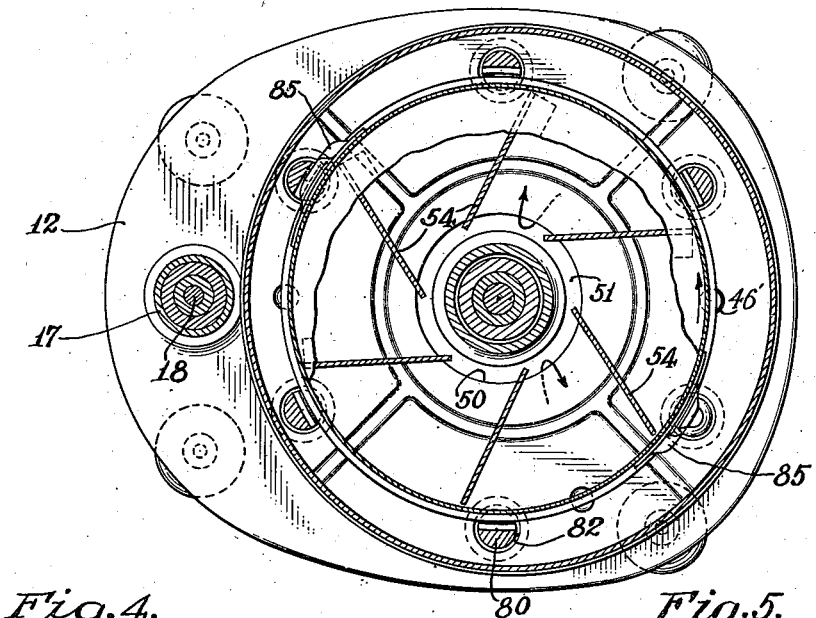
Fig. 3 is a plan section taken along the line 3—3 of Fig. 2.

In the form chosen for illustration herein the invention is embodied in a washer 10 of portable construction adapted to be readily and easily mounted in the present wash tanks such as the tank 11 shown in Fig. 2. The washer 10 as herein shown is self-contained and unitary in construction, in that it comprises a base 12 adapted to rest on the bottom 13 of the tank 11 through the medium of suction cups 14; and on the base 12 there is mounted a rotary scrubbing means 15 and a driving means therefor, such as an electric motor 16 supported in an elevated position by a column 17 upstanding from one end of the base 12.

The brushing means 15 being rotary in character, a suitable rotary drive is provided therefor, comprising in the form illustrated, a suitable reduction gearing (not shown) in the lower end of the motor housing, which gearing drives a shaft 18 extending downwardly through the tubular column 17. At its lower end and within the base 12 the shaft 18 carries a pinion 19 and this pinion engages a main gear 20 also contained in the base.

As shown in Fig. 2, the base 10 has a removable bottom wall 21 secured by screws 22 to the downward flanges 23 formed about the edge of the top wall 24 of the base. To provide a suitable bearing for the gear 20, the bottom wall 21 has an upstanding sleeve 25 formed integrally therewith so as to extend upwardly through a central opening 26 formed in the gear 20. This sleeve 25 is of such a height that it also projects through an opening 27 in the top wall 24 and for a substantial distance above said wall. The gear 20 also has a sleeve 28 associated therewith, this sleeve being positioned in surrounding spaced relation to the stationary sleeve 25, and having its lower end fixed in the central opening 26 of the gear 20. At the point where the sleeve 28 extends through the opening 27 of the top wall 24, an annular rubber ring 29 is set in a suitable groove in the outer surface of the sleeve 28 so as to seal the opening 27 against the entry of foreign matter which might damage the gears 19 and 20.

At its upper end the sleeve 28 is flanged inwardly and has secured therein the head 30 of a bearing pin 31 which projects downwardly through a bearing sleeve 32 mounted within the stationary sleeve 25. The bearing sleeve 32 is preferably of a water lubricated bearing material, and a spiral groove 33 is formed in the bearing pin 31 to elevate water throughout the length of the bearing. At its lower end the bearing pin 31 rests on a block 35 of bearing material, the block 35 being supported on a detachable plate 36 secured to the bottom wall 21 beneath the open lower end of the sleeve 25. Preferably the plate 36 is rather loosely fitted so that sufficient water may enter to provide for the proper lubrication of the bearing surfaces.

The brushing means 15 is mounted through intermediate means upon the upstanding gear sleeve 28, so as to be rotated thereby, and there is provided about the brushing means an inner protecting and circulation-directing housing 40, and a spaced outer casing 41 in which an elevated body of washing fluid may be built up and maintained when the tank 11 is too shallow to submerge the inner housing 40. As shown in Fig. 2, the tank 11 has an overflow 42 which produces a normal fluid level 43 which is too shallow to permit proper circulation through the housing 40. Thus the outer casing 41 extends for a substantial distance above the top of the housing 40 and provides for the maintenance of an elevated body of washing fluid reaching a level such as the level 44 which provides for constant circulation of fluid through the brush structure 15 and the housing 40. This elevation of the water within the casing 41 is attained by pumping means, indicated as generally by the numeral 45 in Fig. 2, which draws its supply from the exterior of the casing 41 and discharges into the casing 41.

In accordance with the present invention the outer casing 41, the inner housing 40 and a portion of the brush supporting means all cooperate in forming the pumping means 45, and the relation of these various parts is such as to facilitate manufacture as well as dis-assembly and re-assembly of the washer by the user. Thus the solid cylindrical side wall of the casing 41 has a bottom wall 46 secured thereto by means of a flange 47, and this bottom wall 46 of the casing 41 serves as the bottom wall for a centrifugal pump chamber. The bottom wall 46 is preferably formed to provide for the passage of fluid into the pump chamber, and to this end is supported in vertically spaced relation to the top wall 24 of the base 12, as by means of raised shoulders 48 (Fig. 5) formed on the base 12. Thus there is an inlet space 49 beneath the casing 41, and by means of a large opening 50 formed in the wall 46 so as to surround the sleeve 28 in spaced relation, there is formed an annular pump inlet port 51 (Fig. 3) through which fluid from the inlet space 49 may pass upwardly into the pump chamber.

Figure 5:
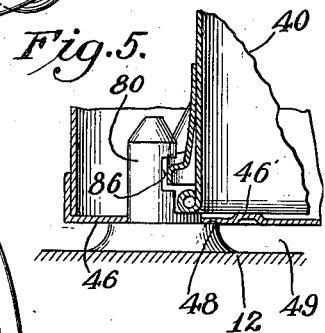
Fig. 5 is a fragmental vertical sectional view taken along the line 5—5 of Fig. 4 and showing the assembly of the inner and outer casings of the washer.

The side peripheral wall of the pump chamber is formed by the lower end of the inner housing 40, which, as shown in Figs. 2 and 5, extends down and rests upon a plurality of slightly elevated bosses 46' formed in the bottom wall 46. The upper wall of the pump chamber is preferably formed by means such as a glass catching pan 52 which rotates with the gear sleeve 28 and serves as a support for the outer or side brushes 53. The glass catching pan 52, being a rotating element, is utilized to carry a plurality of pump blades 54 which serve to discharge water from the pump chamber through a plurality of pump outlets 55 formed about the lower end of the housing 40. In addition to its function in carrying the pump blades 54 and in forming the top wall of the pump chamber, the glass catching pan 52 functions to catch and retain any chips or broken glass, thereby to prevent damage to the rotating parts of the device.

Figure 4:
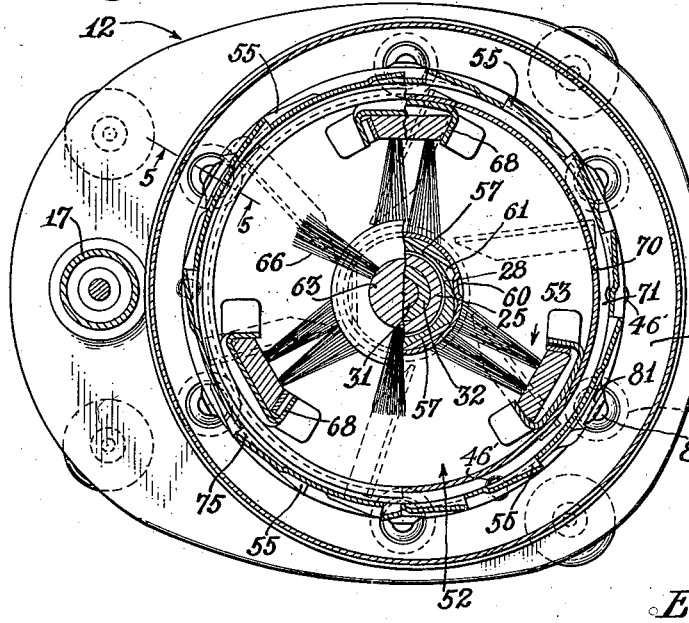
Fig. 4 is a plan section taken along the line 4—4 of Fig. 2.
Figure 6:
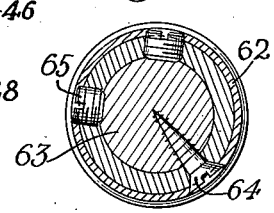
Fig. 6 is a sectional view along the line 6—6 of Fig. 2.

As shown in Figs. 2 and 4, the glass catching pan 52 has a bottom wall 56 with an upwardly flanged central opening shaped to surround the upper end of the sleeve 28 and interlock with the three flattened sides 57 thereof. The wall 56 rests on an annular shoulder 58 on the sleeve 28 so as to be supported in the desired spaced relation to the bottom wall 46, and is held in place by a brush supporting sleeve 59 which surrounds the sleeve 28 above the central flange of the glass pan. The sleeve 59 has inwardly projecting lugs 60 which, in the assembly of the parts, move down along the flattened sides 57, and are then moved, by rotation of the sleeve 59, into cam locking grooves 61 (Figs. 2 and 4) formed in the sleeve 28 between the adjacent flattened sides 57. In the upper end of the sleeve 59 a brushing receiving socket 62 is fixed, as by a press fit; and a center brush core 63 has its lower end mounted therein. Preferably the socket 62 has a screw 64 extending radially into the brush core 63 as shown in Fig. 6, and is provided with a pair of set screws 65 for centering and alining the brush core 63. In the present washer the core 63 has three vertical rows 66 of bristles, spaced at 120° so as to extend into the spaces between the bristles of the three similarly spaced outer brushes 53. The core 63 is also provided with a substantial upper tuft 67 of bristles. The outer brushes 53 are mounted in vertical dovetail channels 68 secured to the bottom of the glass catching pan 52, the channels 68 also being welded to the outer upstanding flange or side wall 70 of the glass catching pan 52.

The outer or side wall 70 of the glass catching pan 52 is preferably spaced from the housing 40, as indicated at 71 in Figs. 2 and 4, so that the outlet openings 55 of the pump chamber may be elongated in a vertical direction. Thus the outlets 55 as herein shown are in the form of vertically elongated louvres facing or opening in the direction of rotation of the pump. The wall 70 extends above the upper ends of the outlets 55 and is outwardly flanged as at 72 to run with but a slight clearance within the housing 40. Thus water forced radially outwardly by the pump blades 54 may pass through the annular space 71 and discharge throughout the entire area of the discharge openings 55. The pump blades 54 may be of any desired form but are herein shown as being formed by sheet metal angles secured to the lower face of the wall 56. The blades 54 are of such a height, as shown in Fig. 2, as to be supported out of contact with the bottom wall 46.

When the washer 10 is placed in the tank 11, the washing solution passes freely through the space 49 and the pump inlet port 51 so as to fill the casing 41 to the water level, such as the level 43, and when the motor 16 is started, the pump 45 quickly raises the level of the solution within the casing to a point or level such that it covers the brushing means 15 and the inner housing 40. With this elevated solution level in the casing 41, a vigorous circulation of the fluid through the housing 40 is initiated, there being a plurality of discharge ports or louvres 75 formed in the housing 40 immediately above the upper edge of the outer flange 70 of the glass catching pan. Thus the rotation of the brushing means discharges solution from the louvres 75 so as to cause rapid and continuous flow or circulation of solution into the top of the housing 40. Preferably the louvres 75 are directed reversely as respects the direction of rotation of the brushing means, whereby to prevent cavitation of the fluid within the casing 41.

The pump 45 is designed to supply an excess of fluid beyond the quantity necessary to maintain the desired elevated fluid level, as at 44, and as a result there is ordinarily a slight overflow from the casing 41. In accordance with the present invention this overflow is controlled to improve the appearance of the machine while in operation, and to control and prevent splashing of the overflowing liquid on the surrounding liquid surface 43. To this end the casing 41 has its main cylindrical side wall 41 terminating at the desired level 44, and has a separately formed top ring 76 secured thereto. This top ring has a plurality of outwardly pressed louvres 77 formed at its lower edge, facing downwardly, so that when the lower edge of the ring 76 is fixed in surrounding relation to the upper end of the casing wall 41, the liquid above the line 44 may flow downwardly outside of the casing wall, through the louvres 77. The upper edge of the ring 76 preferably has its upper edge rolled or flanged inwardly as at 78 to increase the strength and improve the appearance of the casing 41.

To secure the various elements of the washer in assembled relation, means is provided whereby these elements may be readily assembled initially and whereby the device may be readily taken apart and re-assembled for cleaning purposes. To this end a plurality of upstanding studs 80 are provided on the top wall 24 of the base, the studs 80 being arranged in spaced annular relation such that the lower end of the casing 40 may be placed within their flattened inner faces 81.

Preferably the shoulders 48 for supporting the bottom wall 46 of the casing 41 are formed annularly about the bases of the studs 80, and openings 82 are formed in the bottom wall 46 so that the casing 41 may be placed in position on the shoulders 48. The openings 82 having a snug fit about the annular lower ends of the studs 80, the casing 41 is properly positioned by the studs 80. After the casing 41 is in position, the glass catching pan 52, carrying the side brushes 53, is placed upon the upstanding gear sleeve 28. The housing 40 is then lowered through the open upper end of the casing 41, and positioned within the ring of studs 80 with its lower edge on the bosses 46' of the bottom wall 46 of the casing 41. Means is provided whereby, through a partial rotation of the housing 40, the housing is locked tightly down upon the bosses 46' of the wall 46, thus providing a relatively tight seal about the studs 80, and a firm engagement with the bottom wall 46. This firm engagement assures proper clamping of the casing 41 in the desired position. This locking action is attained in the present instance by a pair of locking cams 85 secured on opposite outer sides of the housing 40 and engageable with locking slots 86 formed in the flat inner faces 81 of the several studs 80. The center brush is then lowered into place, and is fixed in position by rotation so as to engage its locking means 60—61. Thus the several elements of the washing mechanism are effectually held in assembled relation, and yet, are capable of convenient disassembly for inspection or cleaning.

From the foregoing it will be evident that the present invention provides a glass washer wherein the various elements are formed and related in such a manner as to permit economic manufacture and assembly as well as convenient inspection and cleaning by the user.

We claim as our invention:

1. A glass washer comprising, in combination, a base, a rotatable driving member upstanding from said base, an open top casing having a bottom wall with a relatively large opening therein, said casing being supported on said base with said bottom wall in spaced relation to said base and with said driving member projecting upwardly through said opening in spaced relation to the peripheral edge of said opening whereby to define an annular inlet, a glass catching pan within said casing mounted on said driving member for rotation therewith and positioned above the bottom wall of said casing, a plurality of upstanding side brushes carried by said glass catching pan so as to project upwardly therefrom a center brush carried by said driving member, pump blades carried on the lower face of said glass catching pan, a circulation-directing housing surrounding said brushes spaced inwardly from and of a less height than said casing, said housing extending downwardly about said glass catching pan substantially into abutment with said bottom wall whereby to define a pump chamber about said pump blades, said housing having pump outlets therein adjacent to the bottom of said glass catching pan, said pump outlets discharging into said casing, and said housing also having openings slightly above said glass catching pan for discharge of fluid circulated through said housing, said pump blades being operable by said driving member to discharge water into said casing, whereby, when the washer is mounted in a tank having a normal water level too low to submerge said housing, said pump blades induce an elevated water level within said casing.

2. A glass washer comprising, in combination, a base, a rotatable driving member upstanding from said base, an open top casing having a bottom wall with a relatively large opening therein, said casing being positioned with said bottom wall above and in spaced relation to said base and with said driving member projecting upwardly through said opening in spaced relation to the peripheral edge of said opening whereby to define an annular inlet, a glass catching pan within said casing mounted on said driving member for rotation therewith so as to be located a short distance above the bottom wall of said casing, a plurality of brushes carried by said glass catching pan so as to project upwardly therefrom, a center brush carried by said driving member, pump blades carried on the lower face of said glass catching pan, a circulation-directing housing surrounding said brushes spaced inwardly from and of a less height than said casing, said housing extending downwardly about said glass catching pan substantially into abutment with said bottom wall whereby to define a pump chamber about said pump blades, and having pump outlets therein adjacent to the bottom of said glass catching pan, said pump outlets discharging into said casing, and said housing also having openings slightly above said glass catching pan for discharge of fluid, and a common means supporting and positioning said housing and said outer casing in the desired relation to said base and to each other.

3. A portable glass washer adapted to be positioned in a wash tank, said washer comprising, in combination, a base, a rotatable driving member projecting upwardly from said base, an open top casing having a bottom wall with a relatively large opening therein, said casing being positioned with said bottom wall in spaced relation above said base and with said driving member projecting upwardly through said opening in spaced relation to the peripheral edge of said opening whereby to define an annular inlet, a centrifugal pump rotor within said casing above said bottom wall of the casing and mounted on said driving member for rotation therewith, brushing means operatively associated with said driving member, a circulation directing housing surrounding said brushes spaced inwardly from and of a less height than said casing, said housing extending downwardly about said pump rotor and cooperating with said bottom wall to define a pump chamber for said pump rotor, said housing being formed to provide a pump outlet from said chamber, discharging into said casing, and said housing also formed to permit circulation of the water within said casing through said housing and the brushing means, and means operable to secure said inner housing and outer casing in position with relation to each other and with relation to said base.

4. A glass washer of the character described comprising, in combination, a base, a rotatable driving member upstanding from said base, an open top casing having a bottom wall with a relatively large opening therein, said casing being supported on said base with said bottom wall in spaced relation to said base and with said driving member projecting upwardly through said opening in spaced relation to the peripheral edge of said opening whereby to define an annular inlet, a glass catching pan within said casing mounted on said driving member for rotation therewith and located a short distance above said bottom wall of said casing, a plurality of side brushes carried by said glass catching pan so as to project upwardly therefrom, a center brush carried by said driving member, pump blades carried on the lower face of said glass catching pan, a circulation directing housing surrounding said brushes spaced inwardly from and of a less height than said casing, said housing extending downwardly about said glass catching pan substantially into abutment with said bottom wall whereby to define a pump chamber about said pump blades, and having pump outlets therein adjacent to the bottom of said glass catching pan, said pump outlets discharging into said casing, and said housing also having openings slightly above said glass catching pan for discharge of fluid circulated through said housing, said bottom wall having a plurality of small openings formed therein in annular spaced relation beneath and just outside of the lower end of said housing, a plurality of positioning studs extending from said base through said small openings and along the lower outer face of said housing whereby to laterally position said housing and said casing with relation to said base and with relation to each other, and cooperating interlocking means on said housing and a plurality of said studs operable to releasably secure said housing against vertical displacement.

5. A glass washer comprising, in combination, a base, a rotatable driving member upstanding from said base, a plurality of positioning studs upstanding from said base and arranged in a spaced annular row centered on said driving member, said studs having flat annular shoulders around their bases spaced upwardly from the upper surface of said base, an open top casing having a bottom wall with a relatively large opening therein and having a plurality of smaller openings arranged in spaced annular series about and concentric with said large opening and adapted to be positioned over said studs so that said bottom wall rests on said shoulders and is spaced thereby from said base, said driving member projecting upwardly through said opening in spaced relation to the peripheral edge of said opening whereby to define an annular inlet, a glass catching pan within said casing mounted on said driving member for rotation therewith and spaced a short distance above said bottom wall of said casing, brushing means carried by said glass catching pan and said driving member so as to project upwardly therefrom, pump blades rotated by said driving member and located between the lower face of said glass catching pan and said bottom wall, a circulation directing housing surrounding said brushes spaced inwardly from and of a less height than said casing, said housing extending downwardly about said glass catching pan and within said annular row of studs substantially into abutment with said bottom wall whereby to define a pump chamber about said pump blades, said housing being formed to provide an outlet discharging from said pump chamber into said casing, and said housing also having openings slightly above said glass catching pan for discharge of fluid, and cooperating means on said studs and said housing operable by partial rotation of the housing to lock said housing and said casing in position on said base.

6. A glass washer comprising, in combination, a base, a rotatable driving member upstanding from said base, an open top casing having a bottom wall with a relatively large opening therein, said casing being positioned with said bottom wall above and in spaced relation to said base and with said driving member projecting upwardly through said opening in spaced relation to the peripheral edge of said opening whereby to define an annular inlet, a glass catching pan within said casing mounted on said driving member for rotation therewith and spaced upwardly from said bottom wall of the casing, a plurality of side brushes carried by said glass catching pan so as to project upwardly therefrom, a center brush carried by said driving member, so as to project upwardly therefrom, pump blades carried on the lower face of said glass catching pan, a circulation-directing housing surrounding said brushes spaced inwardly from and of a less height than said casing, said glass catching pan having an outer upstanding wall with a slight outward flange at its upper edge, said housing extending downwardly about said glass catching pan in closely spaced relation to said flange and with a greater spacing from lower portions of said side wall, said housing extending substantially into abutment with said bottom wall whereby to define a pump chamber about said pump blades, and said housing having pump outlets therein vertically elongated from points beneath the bottom of said glass catching pan to points adjacent the level of said flange, said pump outlets discharging into said casing, and said housing also having openings slightly above said glass catching pan for discharge of fluid, and means supporting and positioning said housing and said outer casing in the desired relation to said base and to each other.

7. A portable glass washer adapted to be positioned in a wash tank, said washer comprising, in combination, a base member, a rotatable driving element projecting upwardly from said base, an open top casing member having a bottom wall with a relatively large opening therein, said casing member being positioned with said bottom wall in spaced relation above said base member and with said driving element projecting upwardly through said opening in spaced relation to the peripheral edge of said opening whereby to define an annular inlet, a centrifugal pump rotor within said casing member above said bottom wall of said casing and mounted on said driving element for rotation therewith, brushing means operatively associated with said driving element, a circulation-directing housing member surrounding said brushes spaced inwardly from and of a less height than said casing member, said housing member extending downwardly about said pump rotor and cooperating with said bottom wall to define a pump chamber for said pump rotor, said housing member being formed to provide a pump outlet from said chamber discharging within said casing member, and said housing member also being formed to permit circulation of the water within said casing member through said housing member and the brushing means, and releasably engaged means on said three members operable to secure said members in position with relation to each other.

EMANUEL NIELSEN.
EDWARD R. MROSS.
VINCENT W. CUNNINGHAM.